United States Patent [19]

Moore

[11] 4,002,289
[45] Jan. 11, 1977

[54] STATIC-TYPE MIXER AND RECEPTACLE

[76] Inventor: Thomas B. Moore, 32 Progress Parkway, Maryland Heights, Mo. 63043

[22] Filed: July 15, 1975

[21] Appl. No.: 596,171

Related U.S. Application Data

[62] Division of Ser. No. 473,415, May 28, 1974, Pat. No. 3,927,868.

[52] U.S. Cl. .............................. 229/44 R; 206/524; 206/219; 229/14 C; 259/4 AB; 264/46.4
[51] Int. Cl.² .......................................... B65D 5/66
[58] Field of Search ............... 12/142 P; 36/2.5 AL; 264/45.4, 45.5, 45.6, 46.4, 46.5, 46.6; 206/524, 219; 229/14 C, 44 R; 220/9 F; 259/4 A, 4 AB, 4 AC

[56] References Cited

UNITED STATES PATENTS

| | | | |
|---|---|---|---|
| 2,653,139 | 9/1953 | Sterling | 206/524 |
| 3,132,382 | 5/1964 | Magester | 264/46.6 |
| 3,159,312 | 12/1964 | Van Sciver | 259/4 AB |
| 3,383,440 | 5/1968 | Chaloekas | 264/46.5 |
| 3,450,253 | 6/1969 | Nielsen | 206/524 |
| 3,485,347 | 12/1969 | McGill et al. | 206/524 |
| 3,536,190 | 10/1970 | Hirsch et al. | 264/45.4 |
| 3,618,287 | 11/1971 | Gobhal et al. | 206/524 |

Primary Examiner—William Price
Assistant Examiner—Bruce H. Bernstein
Attorney, Agent, or Firm—Koenig, Senniger, Powers and Leavitt

[57] ABSTRACT

Mixing means comprising a disposable static-type mixer having opposed walls of sheet material secured to one another in a pattern such as to establish a flow path therethrough having a plurality of inlets at one end thereof for entry of the materials to be mixed (e.g., two resins forming a two-part plastic foam), an outlet at the other end thereof for exit of the mixture, and a plurality of flow passages between the inlet and the outlets. The flow passages cross one another at a plurality of intersections between the inlets and the outlet for mixing the materials flowing through the passages to the outlet.

A receptacle adapted to receive an item to be packaged and to have plastic foamed in place around the item for protecting the item from damage during shipping, the receptacle having a mouth for placement of the item in the receptacle and for introduction of the plastic material and a disposable static-type mixer secured to the receptacle adjacent its mouth, this static-type mixer being adapted for removable connection to plastic foam material dispensing means and for introducing mixed plastic foam material into the receptacle for foaming in place around the item.

A method of packaging involving placing the item to be packaged in a receptacle, attaching plastic foam material dispensing means to a static-type mixer carried by the receptacle and dispensing mixed plastic foam material into the container around the item via the static-type mixer. The foam dispensing means is then removed from the static-type mixer and the receptacle is closed.

1 Claim, 11 Drawing Figures

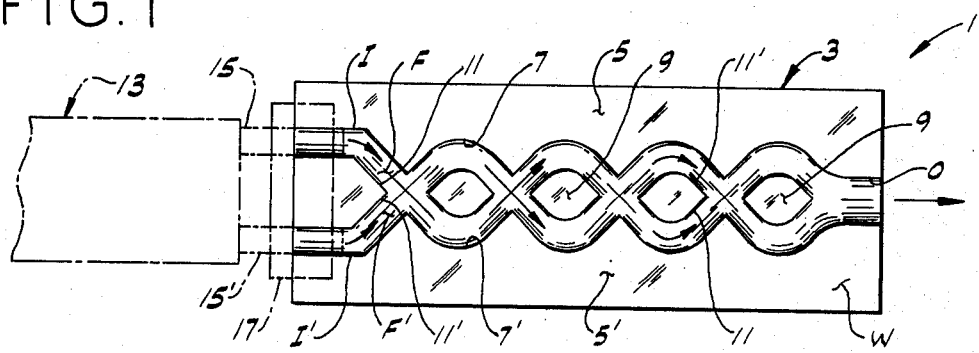
FIG. 1
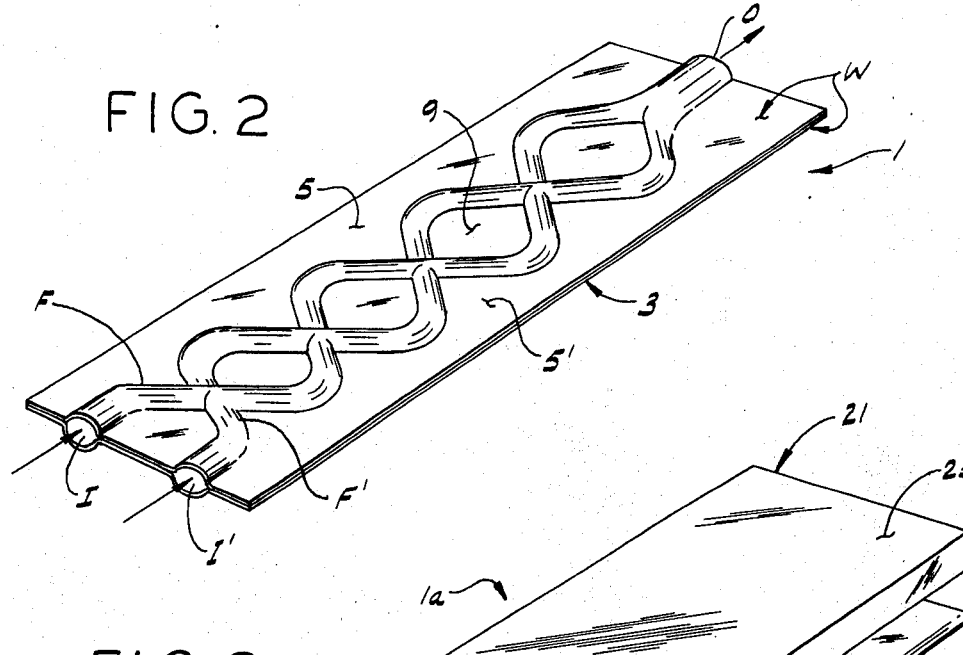
FIG. 2
FIG. 3

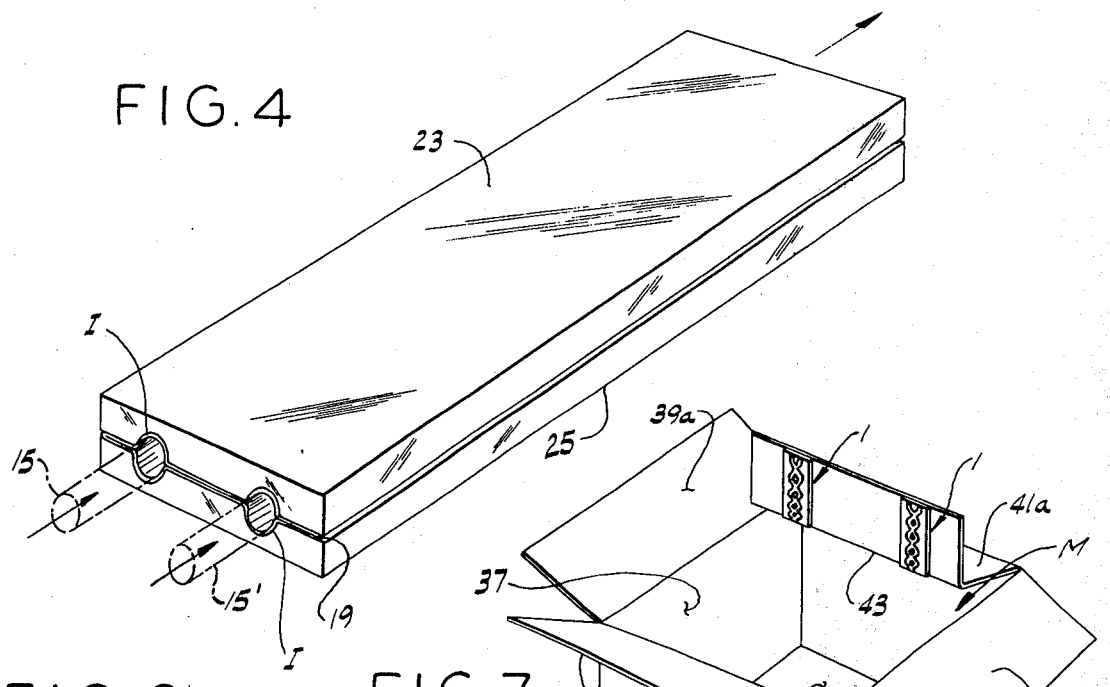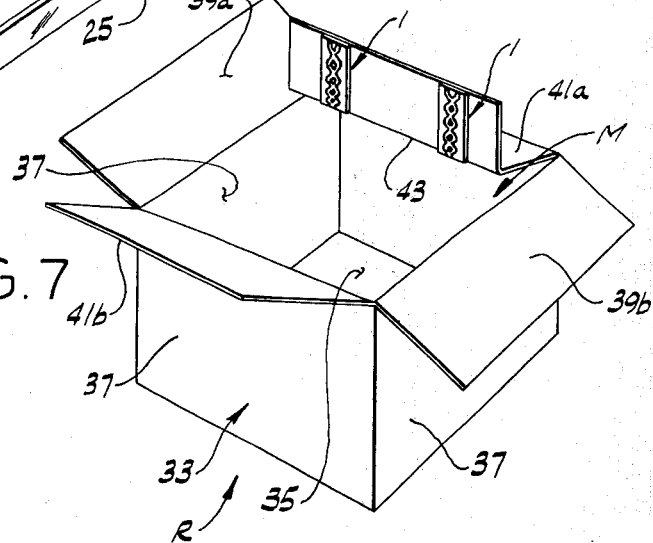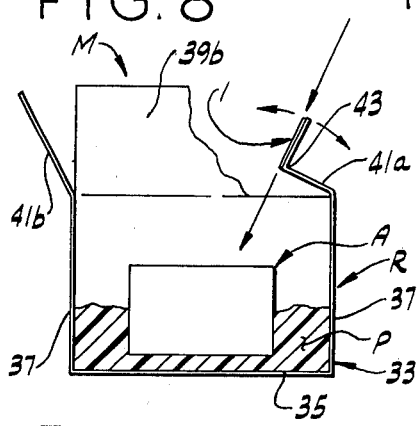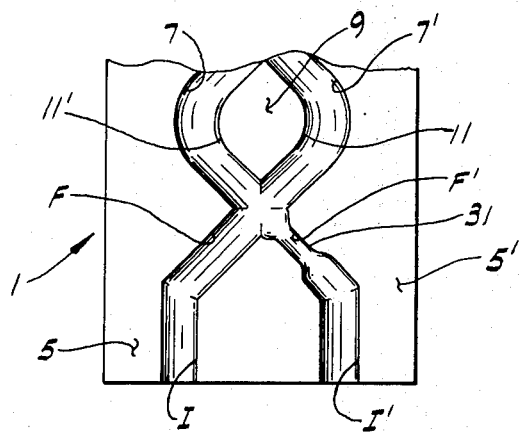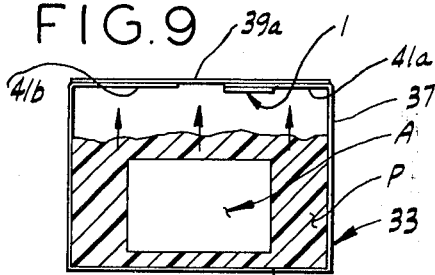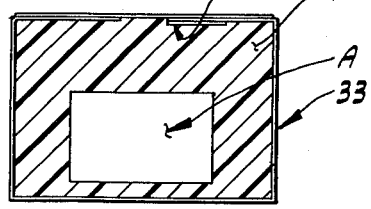

STATIC-TYPE MIXER AND RECEPTACLE

This is a division of application Ser. No. 473,415 filed May 28, 1974, now U.S. Pat. No. 3,927,868.

BACKGROUND OF THE INVENTION

This invention relates to mixing means (e.g., a disposable static-type mixer), a receptacle utilizing a static-type mixer of this invention and a method of packaging utilizing the receptacle and static-type mixer of this invention.

More particularly, the invention is concerned with packaging utilizing foamed-in-place plastic foam, such as a two-part polyurethane foam, which, in liquid form, is poured into a receptacle around an item to be packaged and then allowed to foam up around the item to form a shock-absorbing packaging material surrounding the item thereby to protect the article from damage during shipment. This packaging technique is broadly disclosed in U.S. Pat. No. 2,897,641 and has recently been adopted by industry and U.S. Government agencies to protect delicate instruments and other items.

Typically, polyurethane foams and other similar foam materials require that two chemical components be mixed in proper proportion immediately prior to their use, and that the mixture be immediately dispensed into the receptacle for foaming. These plastic foams often have a relatively short pot life (e.g., only a few seconds). Thus, the mixing and dispensing apparatus must be immediately cleaned after each use or the plastic foam material will set up and clog the apparatus.

Apparatus for mixing and dispensing two-part plastic foam mixtures is known which utilizes a motionless or static-type mixer for mixing the components. However, in this known apparatus, the static-type mixer must be immediately cleaned after each use to prevent clogging. According to U.S. Pat. No. 3,361,412 this is done by introduction of a flushing agent, such as methylene chloride solvent. In some types of mixing and dispensing apparatus, solvent flushing or purging is operator controlled. If the operator neglects to adequately flush the apparatus, the foam will set up this necessitating tear-down and clean-up of the apparatus. In more expensive mixing and dispensing apparatus, the solvent purge is performed automatically after each packaging operation. This flushing operation, whether done manually or automatically, requires time and consumes expensive solvent, thus slowing down production and increasing the cost of foamed-in-place plastic foam packaging.

SUMMARY OF THE INVENTION

Among the several objects of this invention may be noted the provision of an inexpensive disposable static-type mixer which may readily be used in conjunction with relatively simple two-part resin dispensing apparatus; the provision of such a disposable static-type mixer which eliminates the requirement of solvent flushing or other cleaning between packaging operations; the provision of such a disposable static-type mixer which automatically meters the flow rate and velocity of the components being mixed thereby to insure proper mixing of the components in proper proportion; the provision of such a disposable static-type mixer which may be used both in high and low pressure applications; the provision of a foamed-in-place packaging method utilizing a disposable static-type mixer which is feasible for both intermittent use or continuous production; the provision of such a method which minimizes packaging time, material cost, capital investment and labor; the provision of a package which has a disposable static-type mixer attached thereto in position for readily dispensing foam into the package and which facilitates the disposal of the mixer thereby resulting in a neat and attractive package; and the provision of such a mixer, packaging method and package which are easy and economical to use.

Briefly, mixing means of this invention comprises a disposable static-type mixer having opposed walls of sheet material secured to one another in a pattern such as to establish a flow path therethrough having a plurality of inlets at one end thereof for entry of the materials to be mixed (e.g., two resins forming a two-part plastic foam), an outlet at the other end thereof for exit of the mixture, and a plurality of flow passages between the inlets and the outlet. The flow passages cross one another at a plurality of intersections between the inlets and the outlet for mixing the materials flowing through the passages to the outlet.

The receptacle of this invention is adapted to receive an item to be packaged and to have plastic foamed in place around the item for protecting the item from damage during shipping. The receptacle further has a mouth for placement of the item in the receptacle and for introduction of the plastic material. A disposable static-type mixer is secured to the receptacle adjacent its mouth, this static-type mixer being adapted for removable connection to plastic foam material dispensing means and for introducing mixed plastic foam material into the receptacle for foaming in place around the item.

The method of this invention involves placing the item to be packaged in a receptacle, attaching plastic foam material dispensing means to a static-type mixer carried by the receptacle and dispensing mixed plastic foam material into the container around the item via the static-type mixer. The foam dispensing means is then removed from the static-type mixer and the receptacle is closed.

Other objects and features of this invention will be in part apparent and in part pointed out hereinafter.

BRIEF DESCRIPTION OF THE DRAWINGS

FIG. 1 is a plan view of a disposable static-type mixer of this invention shown applied to material dispensing means (illustrated in phantom);

FIG. 2 is a perspective view of the disposable static-type mixer of this invention;

FIG. 3 is a semi-diagrammatic view of a second embodiment of a disposable static-type mixer of this invention in which the inlets, outlet and flow paths through the mixer are formed by opposed dies sealingly holding portions of the mixer together in a predetermined pattern;

FIG. 4 is a perspective view of the dies of FIG. 3 in their closed position forming the static-type mixer of this invention;

FIG. 6 is an enlarged plan view of a portion of a modification of the disposable static-type mixer of this invention adapted to mix components having different viscosities or in different proportions;

FIG. 7 is a perspective view of a receptacle (e.g., a carton) having disposable static-type mixers of this invention applied thereto;

FIGS. 8–10 illustrate the steps in carrying out the packaging method of this invention.

Corresponding reference characters indicate corresponding parts throughout the several views of the drawings.

DESCRIPTION OF THE PREFERRED EMBODIMENTS

Figure 11:
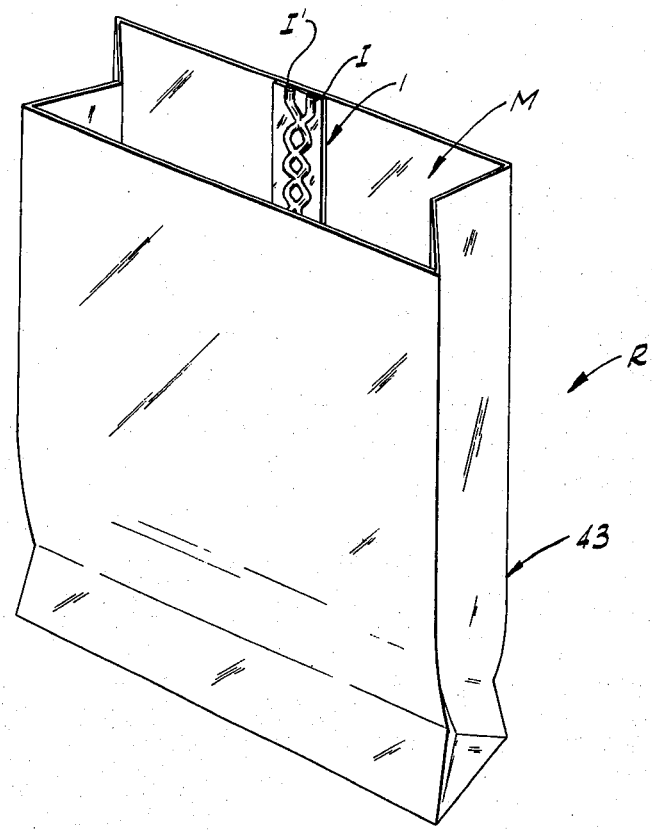
FIG. 11 is a perspective view of another receptacle (e.g., a bag) having a disposable static-type mixer of this invention applied thereto.

Referring now to the drawings and more particularly to FIGS. 1 and 2, mixing means of this invention is shown to comprise a disposable static-type mixer 1. This static-type mixer has opposed walls W of sheet material, such as plastic film, plastic sheeting, plastic-coated paper, metal foil, or the like. Walls W are secured to one another in a pattern such as to establish a flow path (as indicated by the arrows in FIG. 1) therethrough having a plurality of inlets (e.g., two inlets) I and I' at one end of the static-type mixer for separate entry of two streams of materials to be mixed, an outlet O at the other end of the mixer for exit of the resultant mixture and a plurality of flow passages (e.g., two passages) F and F' between the inlets and the outlet with the flow passages crossing one another at a plurality of intersections for mixing the materials as they flow through the mixer to the outlet.

In FIG. 2, static-type mixer 1 is shown to be a length of lay-flat, heat-sealable plastic film tubing 3 joined along its sides and open at its ends with walls W generally in face-to-face relation with one another. Walls W are heat-sealed together in face-to-face relation in a pattern such as to form inlets I and I', flow passages F and F', and outlet O. As indicated at 5 and 5' in FIGS. 1 and 2, the sides of tubing 3 are heat-sealed together with the inner edges 7 and 7', respectively, of heat-seal areas 5 and 5' defining the outer edges of inlets I and I', flow passages F and F', and outlet O. Walls W are also intermittently heat-sealed together at spaced intervals 9 between edges 7 and 7' to define inner edges 11 and 11' of inlets I and I' and flow passages F and F'.

It will be understood that walls W are heat-sealed together and that the heat-sealed areas have sufficient strength to resist delaminating when the materials to be mixed are pumped through the flow passages under pressure. The maximum pressure the mixer can withstand is dependent on the thickness and type of sheet material from which the mixer walls are made. It will be further understood that mixer 1 may have more than two inlets for mixing more than two components in the mixer and discharging mixed material. It will also be understood that the walls may be joined together in face-to-face relation in the above-mentioned pattern by means of adhesive bonding, ultra-sonic welding or by other suitable process. Also, during fabrication of static-type mixer 1, it may be desirable to force air under pressure through flow passages F and F' while heat-seals 5, 5' and 9 are made to insure that the portions of plastic film constituting the inlets I, I', flow paths and outlet O remain separated from one another and from the flow path with a desired cross-sectional shape. This last-mentioned step may be particularly desirable when forming mixers from relatively thick plastic sheeting for mixing of materials at relatively high pressures (e.g., at pressures greater than plastic-film mixers can withstand).

As indicated at 13, means (shown in phantom in FIG. 1) is provided for dispensing the materials to be mixed into inlets I and I' of static-type mixer 1. More particularly, dispensing means 13 is shown to have two separate dispensing tubes 15 and 15' each received by its respective inlet I and I' of the mixer for introducing a separate stream of material to be mixed into the static-type mixer. It will be noted that the streams of materials to be mixed do not come into contact with one another until after they have been introduced into the mixer. Thus, after mixing and dispensing a desired quantity of the material, the static-type mixer may readily be removed from the dispensing means and discarded, and the dispensing means need not be cleaned or flushed because none of the mixed materials has come into contact with the dispensing means. Dispensing means 13 may include means, as indicated at 17, for releasably and sealingly holding static-type mixer 1 on dispensing tubes 15 and 15'. This holding means is shown to comprise a pair of clamping jaws having an open position in which the inlets I and I' of a static-type mixer 1 may readily be inserted on the dispensing tubes 15 and 15' and a closed position in which the static-type mixer is firmly and sealingly held in position on the dispensing tubes while the materials are dispensed from the dispensing means under pressure and forced through flow passages F and F'.

Dispensing means 13 may include pumping and metering means for pumping two streams of the materials to be mixed at desired flow rates to the respective dispensing tubes 15 and 15'. Alternatively, the dispensing means may utilize two containers (not shown) each containing a different material to be mixed. The materials may be dispensed from these containers by means of air pressure or other suitable means. It will be understood that the last-mentioned dispensing means utilizing the two containers would be less expensive and somewhat easier to use and would be particularly adapted for occasional use or for use at locations remote from more complicated dispensing apparatus.

In FIGS. 3 and 4, a second embodiment of the disposable static-type mixer of this invention is indicated in its entirety at 1a to distinguish it from mixer 1. Briefly, opposed walls W of static-type mixer 1a comprise layers of sheet material, such as the opposed walls of the length of lay-flat plastic film tubing 19 open at its ends, and securement means generally indicated at 21 engageable with the outer surfaces of the walls of tube 19 for sealingly holding portions of the walls in face-to-face securement with one another in a pattern such as to form inlets I,I', flow passages F,F' and outlet O. Securement means 21 is shown to comprise a pair of opposed clamping jaws 23 and 25 movable by suitable means (not shown) between a closed position (see FIG. 4) with the jaws sealingly holding portions of the walls W together in face-to-face contact and with other portions of the walls free of one another so as to form the above-mentioned pattern of flow passages, inlets and outlet. The clamping jaws are also movable from their closed to an open position (as shown in FIG. 3) for permitting insertion of one length of tubing 19 and for subsequently permitting removal of the tubing. Clamping jaws 23 and 25 are platen-like members each having a grooved pattern 27 in its inner surface to hold portions of the walls W of tube 19 in face-to-face relation. This grooved pattern is so structured as to grip the walls (when the jaws are in their closed position) in a pattern corresponding generally to the shaded areas 5,5' and 9 of static-type mixer 1 (see FIG. 1). The remaining ungripped portions of walls W of tube 19 are free of one another and thus constitute inlets I,I', flow passages F,F' and outlet O. The grooves 27 of the clamping jaws are of a predetermined depth so as to allow the ungripped portions of walls W to conform to the cross-section of the groove upon the introduction of materials to be mixed under pressure. Dispensing means (not shown) may be removably attached to inlets I,I' of static-type mixer 1a to dispense the materials to be mixed into flow passages F and F' and to discharge mixed material via outlet O.

Disposable static-type mixer 1a is especially adapted to withstand relatively high internal pressures as may be experienced upon the introduction of the materials to be mixed under pressure. With clamping jaws 23 and 25 in their closed positions, the jaws resist the pressure of the materials being mixed flowing through flow passages F and F'. Thus, jaws 23 and 25 enable the disposable static-type mixer 1a to be used at pressures much higher than mixer 1 made of plastic film. After use, disposable mixer 1a may readily be moved from between clamping jaws 23 and 25 and replaced with a new length of tubing 19.

Figure 5:
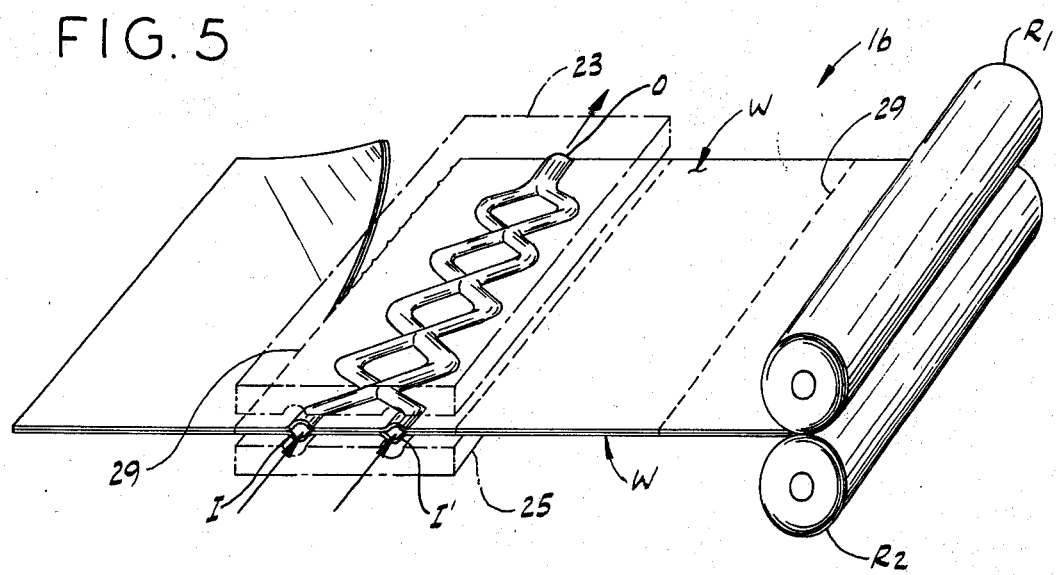
FIG. 5 (sheet 3) is a semi-diagrammatic view of still another disposable static-type mixer of this invention.

In FIG. 5 (sheet 3), a third embodiment of the disposable static-type mixer of this invention is shown indicated in its entirety at 1b. This third embodiment comprises securement means 21 similar to those described above having a pair of clamping jaws 23 and 25. Two webs of sheet material, such as plastic film, are rolled in respective continuous rolls R1 and R2. The webs are segmented by a plurality of equally spaced lines of perforations 29 extending transversely of the webs to form a series of walls W spaced along the length of the webs. Rolls R1 and R2 are brought together in face-to-face relation with their respective lines of perforations 29 in register with one another and are thus fed (either automatically or manually) between jaws 23 and 25. The jaws then close and sealingly hold the webs in face-to-face relation to form a static-type mixer as heretofore described. Similar to static-type mixer 1a, dispensing means (not shown) may be connected to inlets I,I' so as to dispense two streams of materials to be mixed into respective flow passages F and F' and for the discharge of mixed material through outlet O. Upon discharge of the desired amount of mixed material, jaws 23 and 25 are opened and the used portions of rolls R1 and R2 constituting a static-type mixer are fed past the jaws and the next pair of walls W are moved into position between the jaws. It will be understood that the used mixer 1b may readily be removed from rolls R1 and R2 by tearing it from the rolls along a line of perforation 29.

It will be understood that any of the above static-type mixers 1, 1a or 1b may be used to mix a variety of materials, such as liquids, dense viscous materials (e.g., synthetic resins), or powdered or granulated materials. In mixing substances such as two component plastic resins, it is necessary to insure thorough mixing of the components. With the intersecting flow paths F and F' of the static-type mixers of this invention, the components are forcefully mixed at the intersections thereby to insure complete mixing of the components. In mixing two-part plastic resins, such as polyurethane, for plastic foam used in foamed-in-place packaging, the components may each have a foaming or blowing agent such as trichloromonofluoromethane (e.g., a NIAX blowing agent sold by Union Carbide Corporation). These blowing agents generally have a relatively low boiling point so that upon exposure to atmospheric pressure and ambient temperatures they will begin to boil, thus foaming the plastic resins as they are mixed within the static-type mixer of this invention. It is thus important that the static-type mixer has sufficient strength to withstand the pressures generated therewithin upon the boiling of these blowing agents. In static-type mixers for mixing such materials having these blowing agents, it may be desirable that flow paths F and F' be of increasing cross-sectional area as the material flows from inlets I and I' and that outlet O be substantially larger than the inlets.

In FIG. 6, a modification of one of the inlets, for example, inlet I', of any one of the disposable static-type mixers 1, 1a or 1b of this invention is shown. More particularly, this modified inlet has a necked-down portion 31 constituting a metering orifice for supplying material forced therethrough into the static-type mixer at a predetermined flow rate so that the two materials are mixed in a predetermined proportion. This modified inlet may also be used to mix materials of different viscosities in a predetermined proportion. This modified inlet may also be used to regulate velocity of material flowing therethrough.

As heretofore mentioned, the disposable static-type mixers 1, 1a or 1b are particularly useful for mixing two-part plastic resins (e.g., polyurethane resins) for forming foam around an article to be placed in a shipping container so as to protect the article from damage during shipping. In accordance with this invention, a disposable static-type mixer 1 of this invention may be readily used in conjunction with a shipping receptacle R in a manner as will appear for foamed-in-place packaging. As shown in FIGS. 7-10, receptacle R is a paperboard carton 33 having a bottom 35, sides 37 and upper side flaps 39a,39b and upper end flaps 41a,41b with the upper flaps forming a mouth M for placement therein of an item A and for having plastic foam P foamed in place around the item thereby to protect it from damage during shipping. Flap 41a is hingedly creased, as indicated at 43 (see FIG. 8), along a line parallel to the outer edge of this flap intermediate its outer edge and its attachment to its corresponding box side 37 so that the outer end portion of flap 41a may be hingedly bent to extend generally upwardly when this flap is bent back on itself as shown in FIGS. 7 and 8. One or more disposable static-type mixers 1, as heretofore described, are secured to the inner face of flap 41 with their inlets I, I' extending outwardly beyond the outer or free end of flap 41a and with their outlets O adjacent or extending free of the flap adjacent crease 43. Thus, each of the static-type mixers may readily be connected to dispensing apparatus 13 (in a manner as heretofore described) and a desired amount of mixed plastic foam material may be readily introduced into the box so that the resulting foam surrounds item A and protects it from damage during shipping. While dispensing plastic foam material into the box, flap 41a may be flexed (as indicated by the arrows in FIG. 8) back and forth so as to more evenly introduce and distribute the plastic foam material about item A.

Upon introduction of a predetermined amount of plastic material into receptacle R, dispensing apparatus may readily be removed from disposable static-type mixers 1 and flaps 39a, 39b and 41a, 41b may be folded closed to close receptacle R (see FIG. 9). With the flaps closed, it will be noted that the static-type mixers 1 are on the inside of the box and are thus hidden from view. Tape or other sealing means (not shown) may be applied to the exterior of flaps 39a,39b to seal the carton closed.

As shown in FIG. 11, receptacle R may also take the form of a paper or plastic bag 43 having one or more disposable static-type mixers 1 secured to the inside of the bag adjacent its mouth M. The mixer is disposed with its inlets I, I' adjacent the mouth rim of the bag and with its outlet O extending into the bag. Of course, the bag walls are flexible and upon dispensing plastic foam material into the bag, the bag walls adjacent the static-type mixer may be flexed to more uniformly distribute the plastic foam material in the bag so as to surround item A. Upon completion of the introduction of foam material into the bag, its mouth may be closed, such as by clamping, folding, sealing, sewing or the like.

It will be understood that the static-type mixer 1 may be formed by bonding a single sheet of flexible plastic film or the like to the inside surface of the receptacle R wall in such a pattern as to form the pattern shown in FIGS. 1 and 2. Thus, the receptacle wall (i.e., the inside surface of flap 41a of carton 33 or the inside of bag 43) would constitute one of the walls of the static-type mixer.

In accordance with the method of packaging of this invention, an article or an item A to be packaged is placed in a receptacle R (either carton 33 or bag 43) and foam material dispensing means 13 is attached to a static-type mixer 1 carried by the receptacle. Plastic foam material is then dispensed into the receptacle via the mixer and after dispensing a predetermined amount of plastic foam material, the dispensing means is removed from the mixer and the container is closed.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A receptacle for receiving an item to be packaged and for having plastic foamed in place around the item for protecting the item from damage durin shipping, said receptacle having a mouth for placement of the item in the receptacle and for introduction of plastic, and one or more disposable static-type mixers secured to said receptacle adjacent its mouth, said receptacle comprising a carton having at least one closure flap for closing the mouth of the carton, said one or more static-type mixers being secured to said flap for discharge of plastic foam material therefrom and for introduction of said foam material into the carton, said one flap being hingedly folded along a line parallel to the outer edge of the flap intermediate said outer edge and the attachment of the flap to the box so that the outer end portion of the flap may be hingedly bent to extend generally upwardly when said one flap is folded closed, said mixer being secured to the inner surface of the outer end portion of said one flap such that with said one flap folded closed and with said outer end portion thereof extending generally vertically, said mixer is disposed for ready introduction of said plastic foam material into the box.

* * * * *

UNITED STATES PATENT AND TRADEMARK OFFICE
CERTIFICATE OF CORRECTION

PATENT NO. : 4,002,289

DATED : January 11, 1977

INVENTOR(S) : Thomas B. Moore

It is certified that error appears in the above-identified patent and that said Letters Patent are hereby corrected as shown below:

Column 8, line 13, "durin" should read -- during --; Line 25, "box" should read -- carton --; Line 33, "box" should read -- carton --.

Signed and Sealed this

Twenty-sixth Day of April 1977

[SEAL]

Attest:

RUTH C. MASON
*Attesting Officer*

C. MARSHALL DANN
*Commissioner of Patents and Trademarks*